(12) United States Patent
Rexilius et al.

(10) Patent No.: US 8,983,129 B2
(45) Date of Patent: Mar. 17, 2015

(54) DETECTING AND CLASSIFYING PERSONS IN A PRESCRIBED AREA

(75) Inventors: Jan Rexilius, Hannover (DE); Jan Karl Warzelhan, Bad Salzdetfurth Ot Heinde (DE); Matthias Koenig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 13/639,892

(22) PCT Filed: Mar. 25, 2011

(86) PCT No.: PCT/EP2011/054629
§ 371 (c)(1),
(2), (4) Date: Jan. 7, 2013

(87) PCT Pub. No.: WO2011/124483
PCT Pub. Date: Oct. 13, 2011

(65) Prior Publication Data
US 2013/0101165 A1    Apr. 25, 2013

(30) Foreign Application Priority Data
Apr. 7, 2010 (DE) .................. 10 2010 003 669

(51) Int. Cl.
*G06K 9/00* (2006.01)
*G08B 13/196* (2006.01)

(52) U.S. Cl.
CPC .......... *G06K 9/00362* (2013.01); *G08B 13/196* (2013.01)
USPC ....................................................... 382/103

(58) Field of Classification Search
None
See application file for complete search history.

(56) References Cited

U.S. PATENT DOCUMENTS

| 6,907,387 | B1 * | 6/2005 | Reardon ........................ 702/188 |
| 7,505,621 | B1 * | 3/2009 | Agrawal et al. ............... 382/159 |
| 7,738,009 | B2 * | 6/2010 | Rottmann ...................... 348/169 |
| 7,787,656 | B2 * | 8/2010 | Chen ............................. 382/103 |
| 8,068,676 | B2 * | 11/2011 | Zhang et al. .................. 382/224 |
| 8,369,570 | B2 * | 2/2013 | Myers et al. .................. 382/103 |

(Continued)

FOREIGN PATENT DOCUMENTS

WO    WO 2011/124483    * 10/2011

OTHER PUBLICATIONS

International Search Report for Application No. PCT/EP2011/054629 dated May 17, 2011 (English Translation and Original, 4 pages).

(Continued)

*Primary Examiner* — Tahmina Ansari
(74) *Attorney, Agent, or Firm* — Michael Best & Friedrich LLP

(57) ABSTRACT

The invention relates to a method and device for locating persons (12, 14) in a prescribed area (10) monitored by at least one image acquisition device (3), wherein the image acquisition device (3) continuously generates images of the prescribed monitored area (10), said images being analyzed and evaluated by means of at least one image-processing method and/or image analysis method, and to a computer program product and data processing program. According to the invention, the generated images of the prescribed area (10) are analyzed and evaluated for detecting and locating persons (12, 14), wherein detected and located persons (12, 14) are classified and associated with at least one prescribed group, wherein the association with a group is performed depending on prescribed clothing features.

18 Claims, 3 Drawing Sheets

(56) References Cited

U.S. PATENT DOCUMENTS

2008/0212099 A1* 9/2008 Chen .......................... 356/408
2013/0101165 A1* 4/2013 Rexilius et al. ............... 382/103

OTHER PUBLICATIONS

Luo et al., "Human Action detection via boosted local motion histograms," Machine Vision and Applications, Springer-Verlag Berlin-Heidelberg, ISSN 1432-1769, 2008.

Ikizler et al., "Human Action Recognition Using Distribution of Oriented Rectangular Patches," Human Motion—Understanding, Modeling, Capture and Animation, Springer-Verlag Berlin/Heidelberg, ISSN 1611-3349, pp. 271-284, 2007.

Hu et al., "A survey on visual surveillance of object motion and behaviors," IEEE Transactions of Systems, Man and Cybernetics, Part C: Applications and Reviews, vol. 34 (3), pp. 334-352, Aug. 2004.

Madden et al., "Tracking people across disjoint camera views by an illumination-tolerant appearance representation," Machine Vision and Applications, 18(3):233-247, 2007.

\* cited by examiner

DETECTING AND CLASSIFYING PERSONS IN A PRESCRIBED AREA

BACKGROUND OF THE INVENTION

The invention relates to a method for locating persons in a prescribed area and to an associated device for locating persons in a prescribed area, and to a computer program product and a data processing program for carrying out the method.

Image processing methods are nowadays an integral component of automatic video surveillance methods. They are used, for example, for segmenting, detecting, tracking, classifying and counting moving objects within an area to be monitored which is monitored by at least one image acquisition device. The at least one image acquisition device continuously generates images of the prescribed area monitored, which are analyzed and evaluated by using at least one image processing method and/or image evaluation method. The image processing is an essential component for an automatic surveillance of relatively large areas by means of a plurality of image acquisition devices, especially in order to be able to correlate objects with one another which are recorded with different image acquisition devices from different recordings.

In laid-open patent application DE 102 10 926 A1 for example, a device and method for tracking at least one object in a scene are described. The method described detects when a moving object comes to a standstill from its movement, and counts the time it dwells in standstill in order to generate signaling in dependence on the dwell time. In this context, the object is described with respect to the direction of its movement and the time by a list or a matrix. The method described is used, in particular, in a video monitoring system which has at least one image generator, one processor, one memory and output means by means of which signaling can take place, for example in the form of an alarm. The signaling can also be used as a signal for other systems.

SUMMARY OF THE INVENTION

By comparison, the method according to the invention for locating persons in a prescribed area, has the advantage that generated images of a prescribed area are analyzed and evaluated for the detection and locating of persons, wherein persons detected and located are classified and allocated to at least one prescribed group and wherein the allocation to a group is made in dependence on prescribed clothing features.

A device for locating persons in a prescribed area, has the advantage that an evaluation and control unit analyzes and evaluates the generated images of the prescribed area for detecting and locating persons, wherein the evaluation and control unit classifies, allocates to at least one prescribed group, detected and located persons, wherein the evaluation and control unit performs the allocation to a group in dependence on prescribed clothing features. The images of the area to be monitored are generated continuously by at least one image acquisition device and analyzed and evaluated by using at least one image processing method and/or image evaluation method.

The evaluation and control unit according to the invention is arranged for carrying out steps of the above-mentioned method and of a computer program for controlling steps of the aforementioned method when the computer program is executed by the evaluation and control unit. In the present context, an evaluation and control unit can be understood to be an electrical device such as, for example, a control device which processes and evaluates acquired image signals. The control device can have at least one interface which can be arranged in hardware and/or software. In a hardware arrangement, the interfaces can be, for example, part of a so-called ASIC system which contains the most varied functions of the control device. However, it is also possible that the interfaces are individual integrated circuits or consist at least partially of discrete components. In a software arrangement, the interfaces can be software modules which are present, for example, on a microcontroller, apart from other software modules. A computer program product comprising program code is also of advantage which is stored on a machine-readable medium such as a semiconductor memory, a hard disk memory or an optical memory and is used for performing the method according to one of the embodiments described when the program is executed on a control device.

Embodiments of the present invention advantageously provide for a video-based locating of service personnel by means of uniform professional clothing. In addition, embodiments of the present invention can carry out as further tasks the counting of the service personnel and of the customers in predefined areas in order to determine whether there are enough personnel present in an area, i.e. an advantageous ratio of personnel to customers exists. Using this information, an optimum distribution of the personnel can be achieved in order to guarantee the best possible support to the customer. The essential advantage of the present invention lies in the video-based detection of part areas within the area to be monitored in which there is an adequate number or too small a number of persons of the service personnel. Apart from this simple function, extensions with regard to the analysis of the actions just performed by the service personnel are possible in order to determine whether all the service personnel are currently fully occupied and, therefore, further support is still required.

Compared with locating individual persons of the service personnel by means of radio sensors, the video-based analysis has the advantage that the area to be monitored is precisely specified, i.e. there is greater accuracy with regard to the locating of persons of the service personnel. If a person of the service personnel moves out of the visual range of the at least one image acquisition device, this person is thus also no longer available in this region. In addition, the video analysis enables persons of the service personnel and other persons or objects in the area to be monitored to be counted. Thus, the ratio between persons of the service personnel and other persons can be determined in a simple manner. Furthermore, the video analysis can also determine by means of action analysis how many persons of the service personnel are currently involved.

Apart from these analysis functions, embodiments of the present invention also provide for a weak type of access control. If there are only persons with security clothing located in a certain region, this can be determined and reported very simply by the video analysis.

It is particularly advantageous that detected persons who belong to the service personnel are allocated to a first group, all other detected persons being allocated to a group of customers. The prescribed clothing features comprise, for example, prescribed color spectra and/or shapes. Thus, it is possible to distinguish professional clothing items such as, for example, head covers, scarves, jackets, trousers etc. which have a prescribed form and/or color, from "normal clothing" of the customers.

At an airport, airport personnel normally wear visible protective clothing in order to be recognized easily. By this means, they distinctly differ from passengers, who must not stay e.g. outside of certain buildings. When entering or leaving the aircraft with a short footpath over the airfield, for example from the bus to the aircraft, passengers and personnel are together on the airfield. Embodiments of the present invention are capable of distinguishing between both groups of persons. By this means, a passenger who has lost his way can be detected and reported.

At a railroad station, only railroad personnel are allowed to move on the tracks. These can be monitored and reported by embodiments of the invention. Under certain circumstances, for example in the case of train delays, changes in the schedule or train cancellations, the service personnel are greatly sought and questioned by passengers. Embodiments of the invention can then determine whether a large number of customers, i.e. a line of persons or an accumulation of persons is distributed to few persons of the service personnel. By this means, embodiments of the present invention can detect and report in which areas more personnel are needed.

In large shopping centers, it is conceivable that customers look for service personnel. Embodiments of the present invention know where persons of the service personnel are located and can indicate, for example at a service point, the current locations of persons of the service personnel on a monitor.

The technical core of the present invention lies in the recognition of the service personnel by means of the associated professional clothing. In this context, the methods of image processing and classification offer a number of options of achieving this recognition.

One such approach is the recognition by means of the clothing. In this approach, data of the clothing of the service personnel are prescribed to the system either via a number of images of the service personnel in corresponding clothing or directly in a special learning mode. These data allow the method according to the invention to determine clothing features. In the simplest case, the clothing features can be obtained from the color spectrum of the professional clothing. For this purpose, the most significant clothing features can be selected, for example, from a prescribed set of features such as, for example, gradient histograms, color histograms, scale in-variant features such as SIFT etc. by means of a principal components analysis. These are then used as clothing features in order to train a classifier. The classifier can be trained, for example, via a support-vector machine or boosting. During the sequence of the method according to the invention, the classifier trained is applied to the conventional video analysis results and by this means supplies the recognition of persons of the service personnel. The locating is done by means of the known positions of the image acquisition devices or a calibration used as a basis. Methods for detecting actions can be implemented analogously.

In an advantageous embodiment of the method according to the invention, at least one part area of the prescribed area is determined by the position of a person of the group of service personnel and/or by a prescribed number of persons of the group of customers. In addition, in the entire prescribed area and/or in part areas of the prescribed area, the ratio of the number of persons of the group of service personnel to the number of persons of the group of customers can be determined. Corresponding areas can be represented in different colors in dependence on the work load, i.e. on the ratio of personnel to customers determined. If the personnel/customers ratio is correct, such an area can be marked, by example, in green on an output monitor. If there is too high a presence of customers per person of the service personnel, such areas can be emphasized by corresponding warning colors such as yellow, orange or red and, if necessary, additional personnel can be sent to these areas. Areas in which there are no personnel are also detected and classified and service personnel can be sent into these areas depending on the situation.

Advantageous embodiments of the invention are shown in the drawings and will be described in the text which follows. In the drawings identical reference symbols designate components or elements which carry out identical or analogous functions.

DETAILED DESCRIPTION

Figure 1:
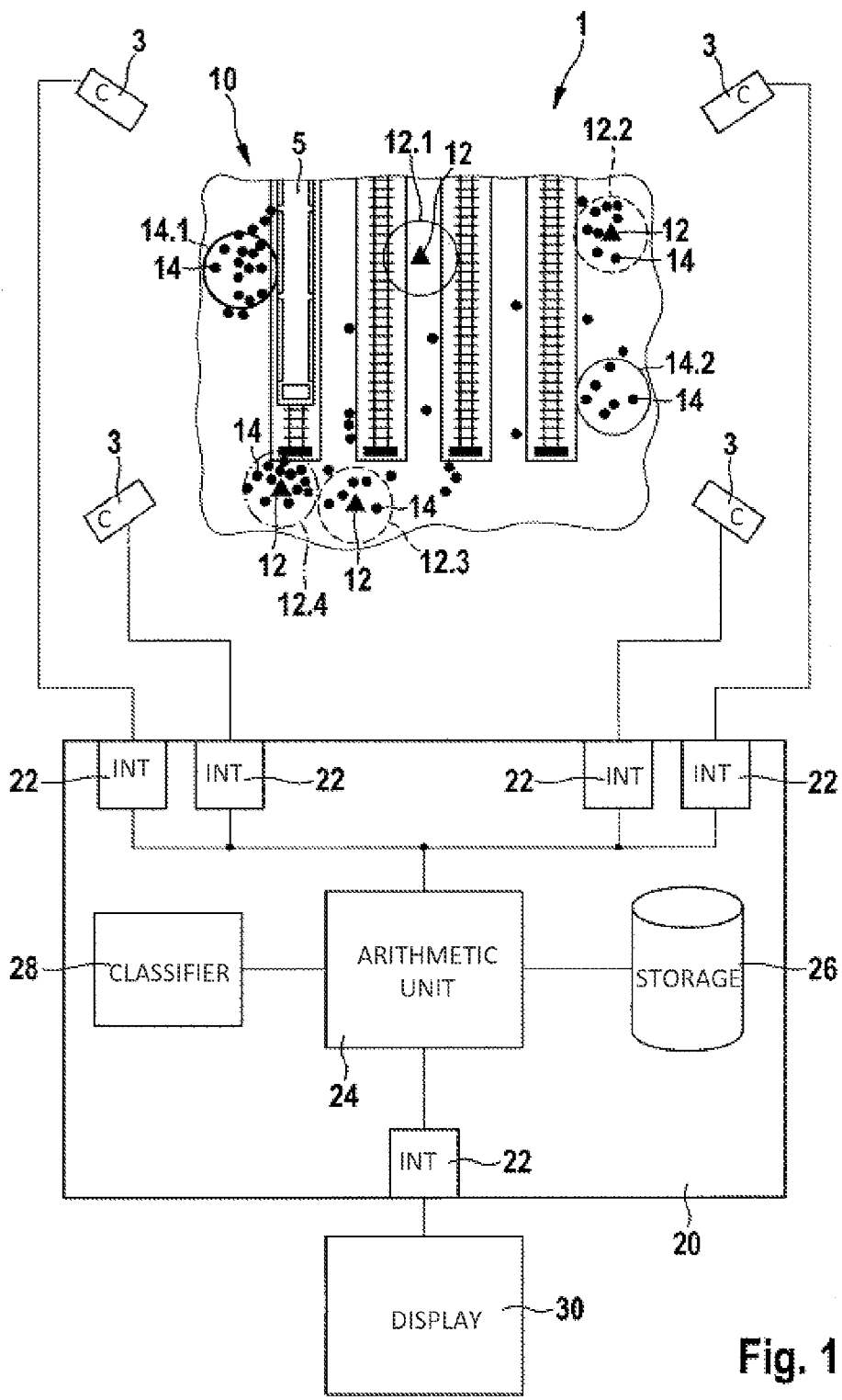
FIG. 1 shows a schematic block diagram of an exemplary embodiment of a device according to the invention for locating persons in a prescribed area.

As can be seen from FIG. 1, a device 1 according to the invention for locating persons 12, 14 in a prescribed area 10 comprises in the exemplary embodiment shown a number of image acquisition devices 3 which, for monitoring the prescribed area 10, continuously generate images of the prescribed area 10 and output these to an evaluation and control unit 20. The evaluation and control unit 20 analyzes and evaluates the images continuously generated by using at least one image processing method and/or image evaluation method. For the reception of the image data generated, the evaluation and control unit 20 is coupled to the image acquisition devices 3 via corresponding interfaces 22.

According to the invention, the evaluation and control unit 20 analyzes and evaluates the generated images of the prescribed area 10 for the detection and locating of persons 12, 14, wherein the evaluation and control unit 20 classifies, and allocates to at least one prescribed group, detected and located persons 12, 14, wherein the evaluation and control unit 20 performs the allocation to a group in dependence on prescribed clothing features. The located and classified persons 12, 14 are output by the evaluation and control unit 20 with further information to an optical display unit 30 via an interface 22.

Figure 2:
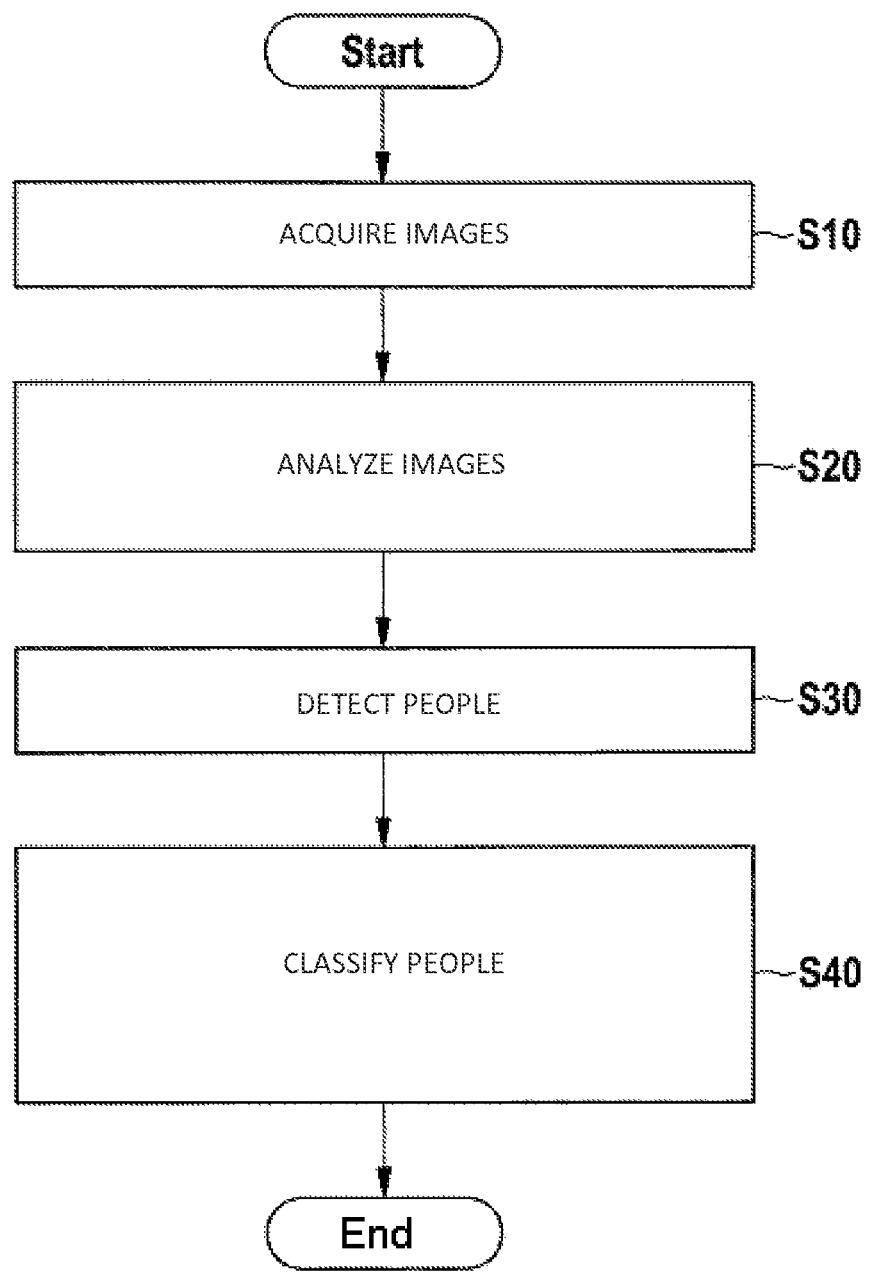
FIG. 2 shows a flowchart of an exemplary embodiment of a method according to the invention for locating persons in a prescribed area.

As can be seen from FIG. 2, the exemplary embodiment shown of a method according to the invention for locating persons 12, 14 in a prescribed area acquires in a step S10 continuously images of the prescribed area 10 by means of at least one image acquisition device 3. In a step S20, the acquired images of the prescribed area are analyzed and evaluated by using at least one image processing method and/or image evaluation method. In a step S30, persons 12, 14 are detected and located in the prescribed area. In a step S40, the persons 12, 14 detected and located are classified and allocated to at least one prescribed group, the allocation to a group being made in dependence on prescribed clothing features. Thus, detected persons 12 who belong to the service personnel are allocated to a first group, all other detected persons 14 being allocated to a group of customers. The prescribed clothing features for distinguishing various detected persons comprise, for example, color spectra and/or clothing shapes.

The technical core of the present invention thus lies in the recognition of persons 12 of the service personnel by means of their professional clothing. In this context, the methods of image processing and classification offer a number of options to achieve this recognition. In this context, data of the clothing of the service personnel are prescribed to the evaluation and control unit 20 either via a number of images of persons of the service personnel in corresponding clothing or directly in a special learning mode. These data allow the evaluation and control unit to determine 20 features. In the simplest case, these could be obtained from the color spectrum of the clothing. For this purpose, the most significant ones could be selected, for example from a prescribed set of features (gradient histogram, color histograms, scale-invariant features such as SIFT, etc.) by means of a principal-components analysis. These are then used as features for training a classifier 28 of the evaluation and control unit 20. The classifier 28 can be trained, for example, via a support-vector machine or boosting.

In the actual operation, the classifier 28 is applied to the conventional video analysis results and by this means supplies the recognition of persons 12 of the service personnel within the prescribed area 10. The locating is done by means of the known positions of the image acquisition devices 3 or, respectively, a calibration used as a basis. Furthermore, methods for detecting actions of the service personnel can be implemented.

For the segmentation, detection, tracking, classification and counting of moving objects in the prescribed area 10, known image processing methods can be used as are described, for example, in the article "A survey on visual surveillance of object motion and behaviors" by W. Hu, T. Tan, L. Wang and S. Maybank, IEEE Transactions of Systems, Man and Cybernetics, Part C: Applications and Reviews, Vol. 34 (3), pp. 334-352, August 2004. For the image processing of the greater area 10 which is monitored by a number of image acquisition devices 3, the methods described in the articles "Tracking people across disjoint camera views by an illumination-tolerant appearance representation" by C. Madden, E. D. Cheng, and M. Piccardi, Machine Vision and Applications, 18(3):233-247, 2007, and "Full-body person recognition system" by C. Nakajima, M. Pontil, B. Heisele, and T. Poggio, Pattern Recognition, 36(9): 1997-2006, 2003 can be used in order to correlate especially objects or persons with one another which are acquired by different image acquisition devices 3.

The advantage of the present invention lies in the video-based recognition of regions in which there are sufficient or too few service personnel, respectively. Apart from this simple function, extensions are possible with regard to the analysis the currently performed action of the service personnel in order to determine whether all the service personnel are currently fully occupied and therefore support is still needed. In addition, the video analysis enables persons 12 of the service personnel and other persons 14 or objects to be counted in the prescribed area 10. By this means, it is possible to determine, e.g., a ratio between service personnel and other persons. Furthermore, the video analysis can also detect by means of action analysis according to the methods described in the articles "Human Action Recognition Using Distribution of Oriented Rectangular Patches" by N. Ikizler and P. Duygulu, Human Motion—Understanding, Modeling, Capture and Animation, Springer-Verlag Berlin/Heidelberg, ISSN 1611-3349, pp. 271-284, 2007 and "Human Action detection via boosted local motion histograms" by Q. Luo, X. Kong, G. Zeng and J. Fan, Machine Vision and Applications, Springer-Verlag Berlin-Heidelberg, ISSN 1432-1769, 2008, the actions of the located persons 12, 14 so that, for example, it can be determined how many persons 12 of the service personnel are currently involved.

To carry out the image processing methods and/or image evaluation methods for the analysis and evaluation of the image data generated and for carrying out the method according to the invention for locating persons in a prescribed area, the evaluation and control unit 20 comprises in the exemplary embodiment shown an arithmetic unit 24, a storage unit 26 and the classifier 28.

Figure 3:
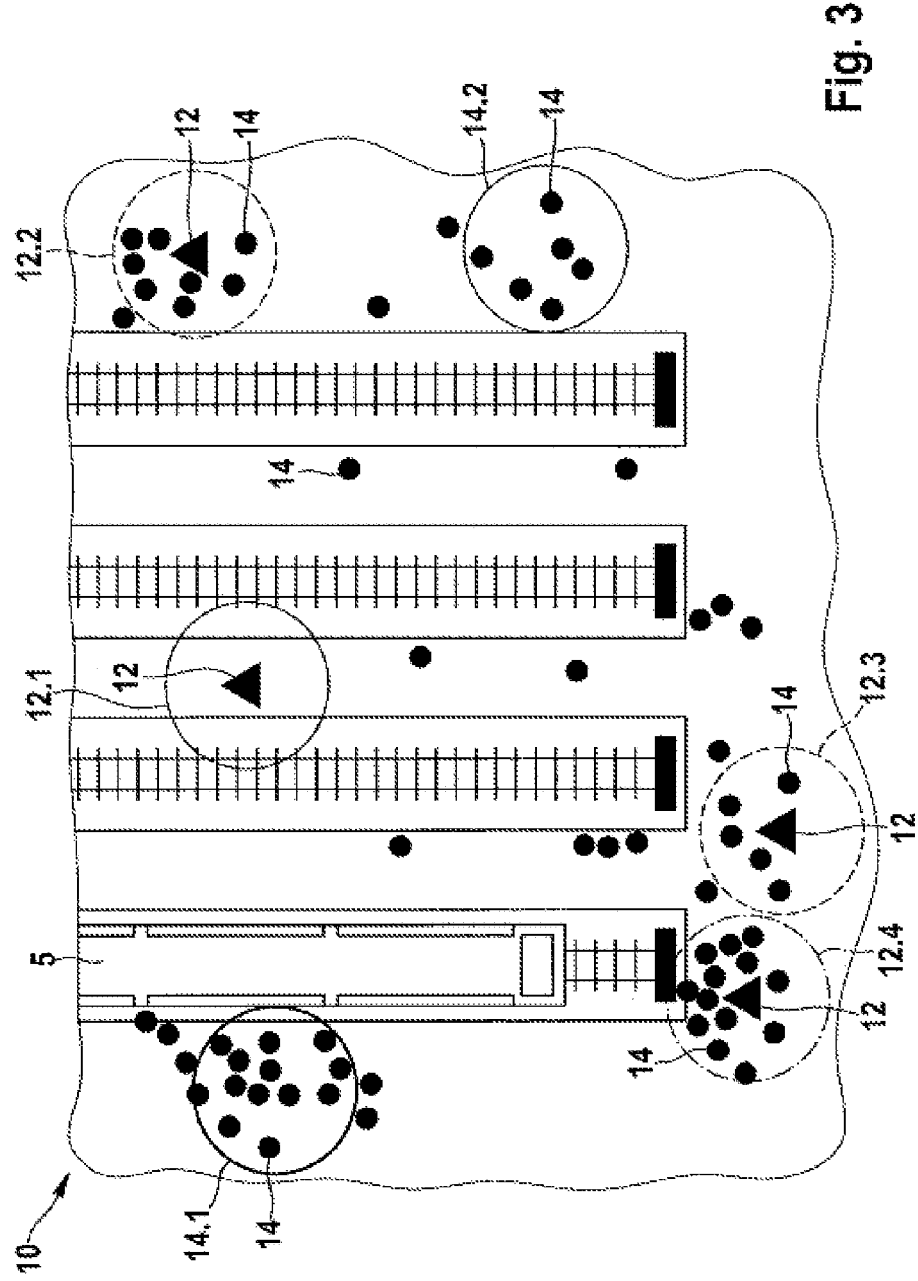
FIG. 3 shows a diagrammatic top view of a prescribed area in which persons are located by means of the device according to the invention according to FIG. 1 or the method according to the invention according to FIG. 2.

As can be seen from FIG. 1 or 3, the prescribed area 10 comprises in the exemplary embodiment shown a part of a railroad terminus having a number of platforms, in which the occurrence of customers and personnel is determined and represented. Embodiments of the invention automatically detect the service personnel 12 and customers 14 by means of video analysis and/or image processing. Subsequently, the number of customers 14 per person 12 of the service personnel is counted. If the workload is correct, such part areas 12.3 are marked, for example, in green. If there is too high an occurrence of customers per person 12 of the service personnel in a part area 12.4 or if there is no person 12 of the service personnel present in a part area 14.1, 14.2 having, for example, at least 5 customers or if there are no customers in the area 12.1 of a person 12 of the service personnel, these areas are emphasized by corresponding marking in a warning color and, if necessary, additional persons 12 of the service personnel are sent there or persons 12 of the service personnel are requested to change their position correspondingly. The part areas 14.1, 14.2 having a predetermined number of customers 14, in which no persons 12 of the service personnel are present, are also detected and classified in order to distinguish whether a normal entering/exiting process or a panic and/or an accumulation of customers is present so that, depending on the situation detected, persons 12 of the service personnel can be sent into these part areas 14.1, 14.2.

As can also be seen from FIG. 1 or 3, the various part areas 12.1, 12.2, 12.3, 12.4, 14.1, 14.2 shown of the prescribed area 10 are determined by the position of a person 12 of the group of service personnel and/or by a predetermined number of persons 14 of the group of customers. Thus, for example, the part areas 12.1, 12.2, 12.3, 12.4 are in each case determined by the position of a person 12, arranged approximately centrally in the respective part area 12.1, 12.2, 12.3, 12.4, of the service personnel, which is shown as a filled-out triangle. The part areas 14.1, 14.2 are determined by a prescribed number of persons 14 which are represented as filled-out circles and belong to the group of customers. Thus, for example, at least five persons 14 of the group of customers without a service person 12 are located is such a part area 14.1, 14.2.

Apart from these analysis functions, embodiments of the invention also provide for a weak type of access control. Should there only be persons with security clothing in a particular region, the video analysis can determine and report this in a very simple manner.

Embodiments of the present invention can be implemented as circuit, device, method, data processing program with program code means and/or as computer program product. Correspondingly, the present invention can be executed completely as hardware and/or as software and/or as combination of hardware and/or software components. In addition, the present invention can be executed as computer program product on a computer-usable storage medium with computer-readable program code, wherein various computer-readable storage media such as hard disks, CD ROMs, optical or magnetic storage elements etc. can be used.

The computer-usable or computer-readable media can comprise, for example, electronic, magnetic, optical, electromagnetic infrared or semiconductor systems, devices, equipment or propagation media. In addition, the computer-readable media can comprise an electrical connection with one or more lines, a portable computer diskette, a random access memory (RAM) a read only memory (ROM), an erasable and programmable read-only memory (EPROM or flash memory), an optical line and a portable CD ROM. The computer-usable or the computer-readable medium can even be paper or another suitable medium on which the program is written and from which it can be electrically acquired, for example by an optical scanning process of the paper or of the other medium, then compiled, interpreted or, if required, processed in another way and then stored in the computer memory.

Embodiments of the invention provide advantageously for the automatic detection and locating of persons of the service personnel by means of their uniform professional clothing. For this purpose, image processing methods are used in the video surveillance system in order to analyze the area to be monitored. In addition, persons of the service personnel and customers are counted in defined regions in order to determine whether there are sufficient personnel in an area. Using this information, an optimum distribution of the personnel can be achieved in order to provide the customers with the best possible support, for example in a supermarket with questions with respect to the location of a product, at the railroad station with respect to travel information etc.

The invention claimed is:

1. A method for locating persons in a prescribed area which is monitored by at least one image acquisition device, wherein the at least one image acquisition device continuously generates images of the prescribed area monitored, which are analyzed and evaluated by using at least one image processing method or image evaluation method, wherein the generated images of the prescribed area are analyzed and evaluated for the detection and locating of persons, wherein persons detected and located are classified and allocated to at least one prescribed group, the allocation to a group being made in dependence on prescribed clothing features, wherein the detected persons who belong to service personnel are allocated to a first group and all other detected persons being allocated to a group of customers, wherein the ratio of the number of persons of the group of service personnel to the number of persons of the group of customers is determined, and a determination is made as to whether the ratio exceeds a threshold.

2. The method as claimed in claim 1, wherein the prescribed clothing features comprise at least one of color spectra and clothing shapes.

3. The method as claimed in claim 2, wherein the clothing features are prescribed by at least one of gradient histograms, color histograms, and scale-invariant features, significant clothing features being selected by means of a principal-components analysis.

4. The method as claimed in claim 1, wherein the prescribed clothing features are used for training a classifier which is trained via at least one of a support-vector machine and a boosting method.

5. The method as claimed in claim 1, wherein at least one part area of the prescribed area is determined by at least one of the position of a person of the group of service personnel and prescribed number of persons of the group of customers.

6. The method as claimed in claim 1, wherein the ratio of the number of persons of the group of service personnel to the number of persons of the group of customers is determined in at least one of the entire prescribed area and part areas of the prescribed area.

7. A device for locating persons in a prescribed area which is monitored by at least one image acquisition device, wherein the at least one image acquisition device continuously generates and outputs images of the prescribed area monitored, which are analyzed and evaluated by an evaluation and control unit by using at least one image processing method or image evaluation method, wherein the evaluation and control unit analyzes and evaluates the generated images of the prescribed area for the detection and locating of persons, wherein the evaluation and control unit classifies, and allocates to at least one prescribed group, detected and located persons, wherein the evaluation and control unit performs the allocation to a group in dependence on prescribed clothing features, and determines a ratio of the number of persons of a group of service personnel to the number of persons of a group of customers, and determines whether the ratio exceeds a threshold.

8. A computer program product with program code which is stored on a non-transitory machine-readable medium, for carrying out the method as claimed in claim 1 when the program is executed by an evaluation and control unit.

9. A data processing program with program code stored on a non-transitory computer readable medium for the execution of the method as claimed in claim 1 by an evaluation and control unit when the data processing program is processed by the evaluation and control unit.

10. The method as claimed in claim 1, further comprising outputting to a display an indication of the ratio for the prescribed area.

11. The method as claimed in claim 10, wherein when the ratio exceeds the threshold the indication displays a first color.

12. The method as claimed in claim 11, wherein the first color is green.

13. The method as claimed in claim 10, wherein when the ratio is less than the threshold the indication displays a warning color.

14. The method as claimed in claim 13, wherein when the ratio is less than the threshold by a first amount the warning color is yellow.

15. The method as claimed in claim 14, wherein when the ratio is less than the threshold by a second amount greater than the first amount the warning color is orange.

16. The method as claimed in claim 15, wherein when the ratio is less than the threshold by a third amount greater than the second amount the warning color is red.

17. The method as claimed in claim 10, wherein when no customers are detected the indication displays a color representative of no customers being present in the prescribed area.

18. The method as claimed in claim 10, wherein when no service personnel are detected the indication displays a color representative of no service personnel being present in the prescribed area.

* * * * *